US012626338B2

(12) United States Patent
Walter et al.

(10) Patent No.: US 12,626,338 B2
(45) Date of Patent: May 12, 2026

(54) METHOD AND IMAGE PROCESSING DEVICE FOR IMPROVING SIGNAL-TO-NOISE RATIO OF IMAGE FRAME SEQUENCES

(71) Applicant: LEICA MICROSYSTEMS CMS GMBH, Wetzlar (DE)

(72) Inventors: Kai Walter, Schriesheim (DE); Constantin Kappel, Schriesheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 332 days.

(21) Appl. No.: 18/249,549

(22) PCT Filed: Oct. 8, 2021

(86) PCT No.: PCT/EP2021/077897
§ 371 (c)(1),
(2) Date: Apr. 19, 2023

(87) PCT Pub. No.: WO2022/089917
PCT Pub. Date: May 5, 2022

(65) Prior Publication Data
US 2023/0394632 A1 Dec. 7, 2023

(30) Foreign Application Priority Data
Oct. 28, 2020 (EP) .................................... 20204428

(51) Int. Cl.
*G06T 5/70* (2024.01)
(52) U.S. Cl.
CPC ...... *G06T 5/70* (2024.01); *G06T 2207/10016* (2013.01); *G06T 2207/10056* (2013.01);
(Continued)
(58) Field of Classification Search
None
See application file for complete search history.

(56) References Cited

U.S. PATENT DOCUMENTS 10,242,455 B2 * 3/2019 Harmsen ................. G06T 7/579
11,216,914 B2 1/2022 Xie et al.
(Continued)

FOREIGN PATENT DOCUMENTS

CN 104933416 A 9/2015
CN 110852961 A 2/2020
(Continued)

OTHER PUBLICATIONS

Burger et al.: "A Variational Model for Joint Motion Estimation and Image Reconstruction", arxiv.org, Cornell University Library, 201 Olin Library Cornell University Ithaca, NY 14853, Jul. 12, 2016 (Jul. 12, 2016), XP080713551, pp. 1-39.
(Continued)

*Primary Examiner* — Randolph I Chu
(74) *Attorney, Agent, or Firm* — LEYDIG, VOIT & MAYER, LTD.

(57) ABSTRACT

A method for improving signal-to-noise of image frames is provided. The method includes estimating a representative velocity of an optical flow in an image frame sequence. The method also includes determining an interpolation factor from the representative velocity of the optical flow. The method also includes employing a trained artificial neural network for generating an expanded image frame sequence. The expanded image frame sequence includes a number of interpolating image frames. Each interpolating image frame interpolates between subsequent image frames of the image frame sequence. The number of interpolating image frames corresponds to the interpolation factor. The method also includes computing a time-dependent combination of image frames from the expanded image frame sequence to generate an output image frame sequence.

15 Claims, 7 Drawing Sheets

(52) U.S. Cl.
CPC .............. *G06T 2207/20084* (2013.01); *G06T 2207/20182* (2013.01)

(56) References Cited

U.S. PATENT DOCUMENTS

| | | | | |
|---|---|---|---|---|
| 11,232,156 | B1 * | 1/2022 | Wang ...................... | G06N 3/047 |
| 11,394,900 | B1 * | 7/2022 | Sandofsky ........... | H04N 5/2625 |
| 12,335,471 | B2 * | 6/2025 | Ohkawa ................ | H04N 19/159 |
| 12,341,964 | B2 * | 6/2025 | Kato .................... | H04N 19/105 |
| 2011/0032419 | A1 * | 2/2011 | Sakaniwa .............. | H04N 7/014 |
| | | | | 348/E7.003 |
| 2011/0193864 | A1 * | 8/2011 | Zwart ....................... | G06T 1/00 |
| | | | | 382/277 |
| 2011/0299793 | A1 * | 12/2011 | Miura ....................... | G06T 5/75 |
| | | | | 382/275 |
| 2012/0002105 | A1 | 1/2012 | Hirayama et al. | |
| 2017/0037483 | A1 | 2/2017 | Hayashi et al. | |
| 2017/0354392 | A1 | 12/2017 | Fengler et al. | |
| 2018/0205884 | A1 * | 7/2018 | Hornung .............. | H04N 13/111 |
| 2019/0226972 | A1 | 7/2019 | Javidi et al. | |
| 2020/0037896 | A1 | 2/2020 | Aguilar-Mendoza et al. | |
| 2021/0109045 | A1 * | 4/2021 | Barentine .............. | G02B 27/58 |
| 2021/0150693 | A1 * | 5/2021 | Fornwalt ............... | G06T 7/0002 |
| 2021/0374910 | A1 * | 12/2021 | Song ........................ | G01S 15/89 |
| 2022/0101123 | A1 * | 3/2022 | Kim .......................... | G06T 7/20 |
| 2023/0239462 | A1 * | 7/2023 | Kang ........................ | G06T 9/00 |
| | | | | 375/240.16 |
| 2023/0394632 | A1 * | 12/2023 | Walter ...................... | G06T 5/70 |

FOREIGN PATENT DOCUMENTS

| | | |
|---|---|---|
| CN | 111539879 A | 8/2020 |
| DE | 102018127265 A1 | 5/2019 |
| JP | 2012015753 A | 1/2012 |

OTHER PUBLICATIONS

Farnebäck, Gunnar: "Two-Frame Motion Estimation Based on Polynomial Expansion", In: "ICIAP: International Conference on Image Analysis and Processing, 17th International Conference, Naples, Italy, Sep. 9-13, 2013. Proceedings", Jan. 1, 2003 (Jan. 1, 2003), Springer, Berlin, Heidelberg 032548, XP055500834, pp. 1-8.

Choi Myungsub et al.: "Channel Attention is All You Need for Frame Interpolation", Proceedings of the Aaai Conference on Artificial Intelligence, vol. 34, No. 07, Apr. 3, 2020 (Apr. 3, 2020), pp. 10663-10671, XP055787792.

Sun et al.: "PWC-Net: CNNs for optical flow using pyramid, warping, and cost volume" Proceedings of the IEEE Conference on Computer Vision and Pattern Recognition, 2018, arXiv:1709.02371v3, Jun. 25, 2018, pp. 1-18, Arxiv.org, Ithaca, NY, US.

Baker et al.: "A database and evaluation methodology for optical flow", International Journal of Computer Vision 92.1, Mar. 2011, pp. 1-31, Springer, Germany.

Meyer et al.: "Phase-based frame interpolation for video", in Proceedings of the IEEE conference on Computer Vision and Pattern Recognition, Jun. 2015, Boston, MA, US, pp. 1410-1418.

Xue et al.: "Video enhancement with task-oriented flow", International Journal of Computer Vision, 127, pp. 1106-1125, Nov. 2019, Springer, Germany.

Soomro et al.: "UCF101: A dataset of 101 human actions classes from videos in the wild", arXiv:1212.0402v1, Dec. 3, 2012, Arxiv.org, Ithaca, NY, US, pp. 1-7.

Yue et al.: "*A Fast Frame Rate Upconversion Algorithm Based on Adaptive Compensation*", School of Electronic Engineering, VIPS Laboratory, Xi'an University of Electronic Science and Technology, Act a Photonica Sinica, Light Photon Science Journal, vol. 37 No. 11, Nov. 2008, Article ID: 1004-4213(2008)11-2336-6.

* cited by examiner

50 the artificial neural network is
trained on general, not domain-
specific image frames — 52 fine-tuning the pre-trained artificial
neural network by training with
domain-specific images — 54

1

METHOD AND IMAGE PROCESSING DEVICE FOR IMPROVING SIGNAL-TO-NOISE RATIO OF IMAGE FRAME SEQUENCES

CROSS REFERENCE TO RELATED APPLICATIONS

This application is a U.S. National Phase application under 35 U.S.C. § 371 of International Application No. PCT/EP2021/077897, filed on Oct. 8, 2021, and claims benefit to European Patent Application No. EP 20204428.5, filed on Oct. 28, 2020. The International Application was published in English on May 5, 2022 as WO 2022/089917 A1 under PCT Article 21(2).

FIELD

This disclosure relates to systems and methods for improving signal-to-noise in image frame sequences.

BACKGROUND

High-resolution imaging techniques such as magnetic resonance imaging or fluorescence microscopy allow capturing time lapses of objects such as biological specimen or in-vivo biological tissue. Capturing high-resolution time lapses of biological structures is challenging because high frame rates are required to capture relatively fast movements, while also protecting biological structures from damage incurred by the microscopy method.

For example, time lapse fluorescence microscopy of biological specimens on the one hand requires high frame rates to allow for capturing fast movements of the cells and on the other hand requires minimizing the excitation laser intensity to reduce cell damage. In addition, photo bleaching leads to loss of fluorescence imaging. Such opposing requirements often lead to very small signal-to-noise ratios of the acquired images. Other microscopy methods suffer from similar problems. In confocal microscopy the low signal-to-noise ratio is even more prominent because light excluded by the pin hole does not contribute to the images. STED microscopy also suffers from the described problems because it has an intrinsically low photon budget due to depletion of large parts of the excitation at the focal point.

To improve signal-to-noise of image frame sequences, time-dependent combinations of the image frames may be applied. For example, rolling average with exponential weighting may be applied, such as according to $$I_{RA}(t, r) = [I * B](t, r), B(t) = e^{-\frac{|t|}{\sigma}}\Theta\left(|t| - \frac{w}{2}\right),\tag{1}$$

where I is the image frame sequence, $\sigma$ is a width, w is a window size, $\Theta$ is the Heaviside function, and * denotes a convolution operation. However, because rolling averaging involves applying a blurring kernel, fast movements of objects captured in the image frame sequence are smeared. Rolling averaging therefore cannot be applied to improve signal-to-noise of image frame sequences that capture fast moving objects.

Another approach for improving signal-to-noise in image frames is applying recent developments in deep learning methods that now readily offer solutions for de-noising of images. In such approaches, a single image is inputted without considering movement of captured objects in the images. However, it is well known that a significant problem of deep learning algorithms is the creation of inadequate details, so-called hallucinations, from random patterns like noise. Such artifacts become particularly visible in noisy time lapse images.

FIG. 1A illustrates the problem of hallucinations in a de-noising approach of the state of the art. Column 12 of FIG. 1A reproduces two successive fluorescence microscopy image frames captured from a live biological specimen. Applying a de-noising algorithm of the state of the art, Nikon's denoise.ai, to the image frames of column 12 yields the image frames in column 14. As is evident, the de-noising algorithm infers shapes of objects that seem realistic from the very noisy images in column 12. However, a comparison of the de-noised images in column 14 for the successive image frames shows that shapes and positions of the predicted objects change substantially from the upper frame to the lower frame, casting strong doubt on the veracity of the predicted object shapes. Hence, applying de-noising strongly depends on the temporal realization of noise, which implies that de-noising cannot be applied reliably to noisy time lapses.

FIG. 1B illustrates the problem of blurring when applying weighted rolling average according to the state of the art. Panel 16 illustrates an image frame of a simulated image frame sequence capturing a fast-moving object. As indicated by the white arrow, the object moves with a velocity v=(2, −2) pixel per frame. Panel 18 reproduces results of applying a weighted rolling average according to Equation (1) with $\sigma$=4 and w=8. As shown in panel 18, the object is blurred due to contribution of neighboring image frames, heavily distorting the object's true shape.

SUMMARY

In an embodiment, the present disclosure provides a method for improving signal-to-noise of image frames. The method includes estimating a representative velocity of an optical flow in an image frame sequence. The method also includes determining an interpolation factor from the representative velocity of the optical flow. The method also includes employing a trained artificial neural network for generating an expanded image frame sequence. The expanded image frame sequence includes a number of interpolating image frames. Each interpolating image frame interpolates between subsequent image frames of the image frame sequence. The number of interpolating image frames corresponds to the interpolation factor. The method also includes computing a time-dependent combination of image frames from the expanded image frame sequence to generate an output image frame sequence.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
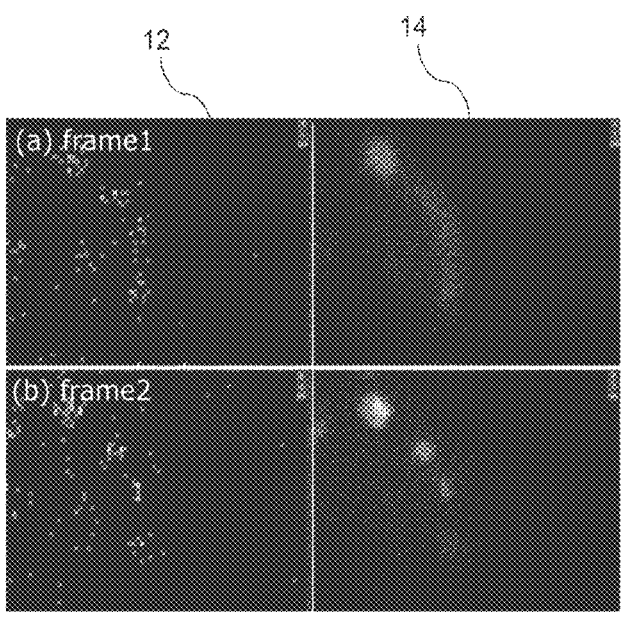
FIG. 1A illustrates applying de-noising to exemplary image frames according to methods of the prior art.

According to an embodiment, a method for improving the signal-to-noise of image frames is disclosed. The method comprises estimating a representative velocity of an optical flow in an image frame sequence, determining an interpolation factor from the representative velocity of the optical flow, and employing a trained artificial neural network for generating an expanded image frame sequence. The expanded image frame sequence may include a number of interpolating image frames, wherein each interpolating image frame interpolates between subsequent image frames of the image frame sequence, wherein the number of interpolating image frames corresponds to the interpolation factor. The method further includes computing a time-dependent combination of image frames from the expanded image frame sequence to generate an output image frame sequence.

According to another embodiment, estimating the representative velocity of the optical flow comprises calculating a histogram of the optical flow between subsequent images frames in the image frame sequence and analyzing the histogram to determine the representative velocity.

According to an aspect, analyzing the histogram to determine the representative velocity comprises employing the histogram to determine the representative velocity as a quantile for a predetermined threshold value. Calculating the histogram may be based on estimating a pixel-wise optical flow, such as by a method based on Farnebäck's algorithm.

In particular embodiments, the method for improving signal-to-noise in image frame sequences may be applied for microscopy image frame sequences.

According to an aspect, the trained artificial neural network employed in the method for improving signal-to-noise in image frame sequences involves a feature reshaping operation with channel attention. In embodiments, the feature reshaping operation is a pixel shuffle operation.

In embodiments, the interpolation factor is a power of two and the trained artificial neural network is configured for recursively generating and adding interpolating image frames to the image frame sequence, wherein the number of recursions corresponds to the power.

According to yet another aspect, computing a time-dependent combination of image frames comprises applying a rolling average to the expanded image frame sequence. The rolling average may be a weighted rolling average and wherein applying the weighted rolling average comprises determining parameters for the weighted rolling average from the representative velocity.

According to an aspect, the parameters for the weighted rolling average are a window size determining a group of image frames from the expanded image frame sequence that contribute to the weighted rolling average, and a width determining a weight by which each image frame from the group contributes to the weighted rolling average.

According to an aspect, the method for improving signal-to-noise in image frame sequences comprises applying a de-noising algorithm to the output image frame sequence.

According to an embodiment, the artificial neural network has been trained by pre-training the artificial neural network with image frame sequences that are not domain specific and training the artificial neural network with domain-specific image frames.

According to an yet another embodiment an image processing device for improving the signal-to-noise of image frames is disclosed. The image processing device comprises a memory configured for saving an image frame sequence at least temporarily, processing circuitry configured for estimating a representative velocity of an optical flow in the image frame sequence and for determining an interpolation factor from the representative velocity of the optical flow, and a trained artificial neural network for generating an expanded image frame sequence, wherein the expanded image frame sequence includes a predetermined number of interpolating image frames, wherein each interpolating image frame interpolates between subsequent image frames of the image frame sequence. The predetermined number may correspond to the interpolation factor, and the processing circuitry may further be configured for computing a time-dependent combination of image frames from the expanded image frame sequence to generate an output image frame sequence.

Figure 2:
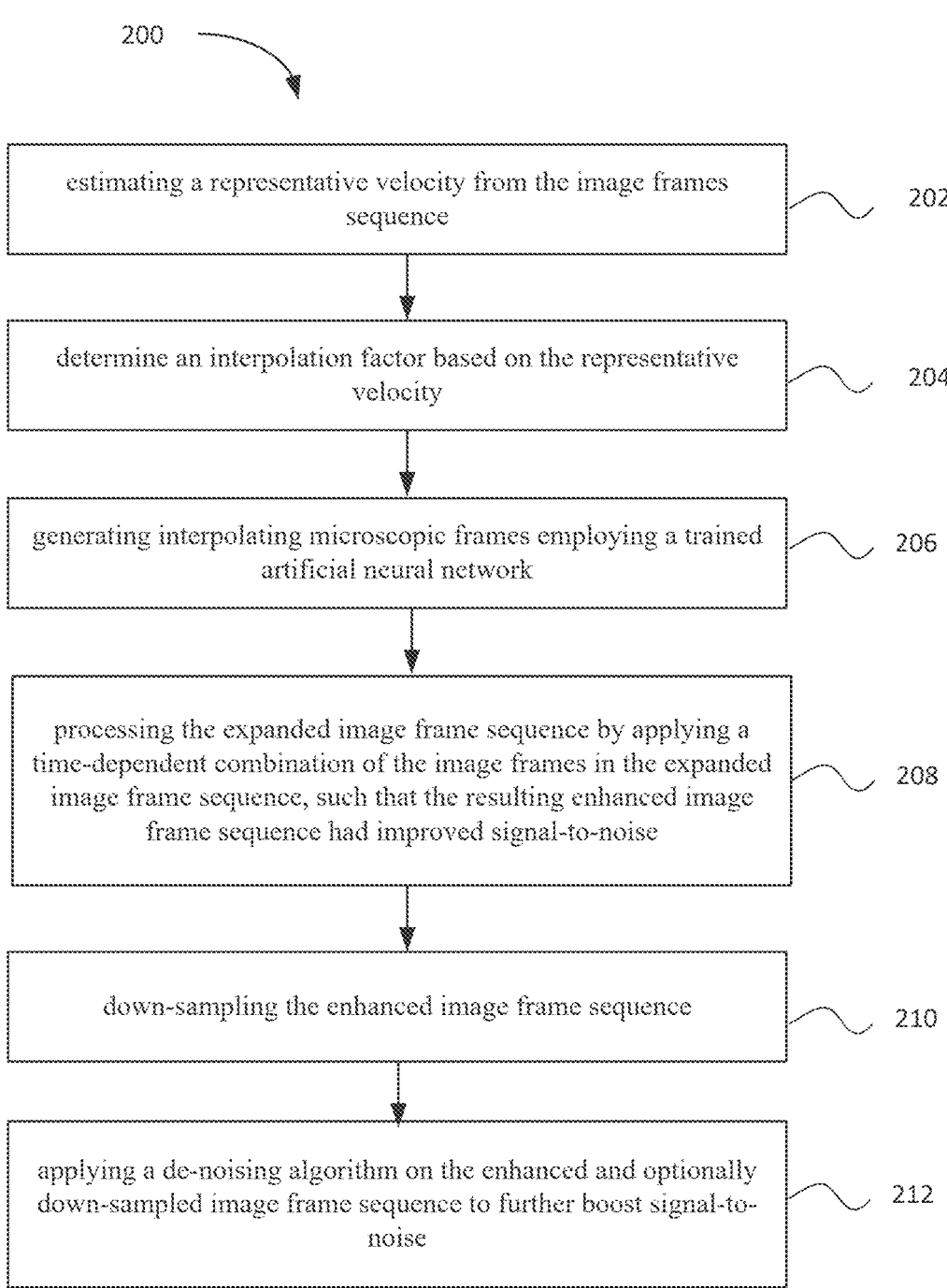
FIG. 2 illustrates a flowchart of a method for improving signal-to-noise in an image frame sequence.

FIG. 2 illustrates steps of a method 200 for improving a signal-to-noise in a sequence of image frames. The image frames of the sequence correspond to two-dimensional, three-dimensional, or even higher-dimensional image data that may comprise several color channels. In embodiments, the image frames relate to a microscopy time lapse. For example, the microscopy time lapse may capture living biological specimens and their motion. In a particular embodiment, the image frames may be captured by a dedicated camera for fluorescence imaging integrated in a surgical microscope. In other embodiments, the image frames may be volumes of biological tissue taken by a medical imaging such as magnetic resonance imaging.

Method 200 comprises estimating 202 a representative velocity $v_{repr}$ from the image frames sequence. A motion of objects captured in the image frames implies a shift of the position of the objects from one image frame to the next image frame. In the present context, the camera is held at fixed position and the velocity is due to intrinsic motion of the captured objects, e.g. of biological motion. The estimated representative velocity may be a velocity near to a maximum velocity of motion of objects captured in the image frames.

In embodiments, step 202 of estimating a representative velocity $v_{repr}$ may comprise calculating a histogram of an optical flow between image frames in the image frame sequence. Calculating the histogram may involve determining values of a dense optical flow $v_{opt}$ between each pair of subsequent image frames in the image frame sequence. In an embodiment, the dense optical flow may be determined pixel-wise by employing Farnebäck's algorithm as described in Farnebäck: "*Two-Frame Motion Estimation Based on Polynomial Expansion*", Scandinavian Conference on Image Analysis 2003, pages 363-370. The histogram may correspond to a histogram in the absolute values $|v_{opt}|$ of the optical flow.

Figure 3:
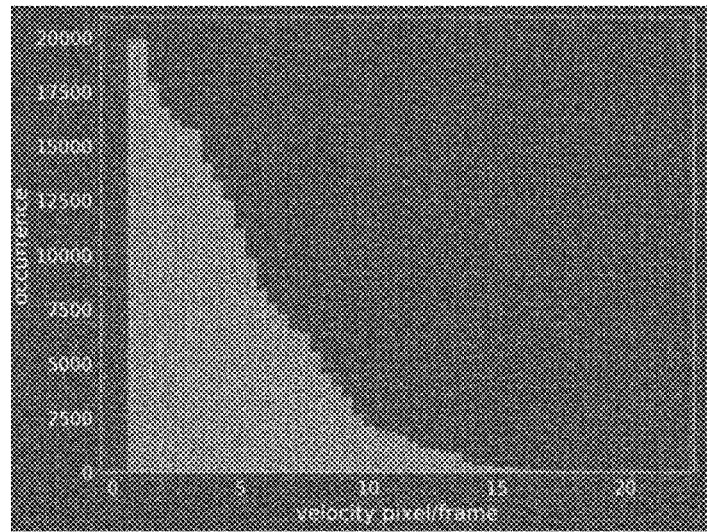
FIG. 3 illustrates a histogram of an optical flow in an image frame sequence as determined in an embodiment.

FIG. 3 shows an exemplary histogram of the optical flow in an image frame sequence. Typically the histogram is peaked at zero because the image background does not move from frame to frame. In embodiments, the representative velocity $v_{repr}$ is determined as a quantile for a predetermined threshold value $$v_{repr} = \text{Quantile}(|v_{opt}|, p). \quad (1)$$

Employing the quantile is sufficient for the purpose of an embodiment of the present invention because this approach minimizes the effect of outliers. Typically the threshold value of p=0.9 is employed so that 90% of all optical flow values $|v_{opt}|$ are smaller than the representative velocity. In the example of FIG. 3, the estimated representative velocity is 10 pixels per frame.

Again referring to FIG. 2, method 200 further comprises step 204, in which the determined representative velocity is employed to determine an interpolation factor $\alpha_{interp}$. The interpolation factor corresponds to a desired improvement in the frame rate such as two or four.

In embodiments, the interpolating factor $\alpha_{interp}$ may be determined such that $v_{repr}/\alpha_{interp} \leq 1$ pixel/frame. In embodiments, the interpolating factor is determined as a power of 2 according to $$\alpha_{interp} = 2^{\lfloor \log_2 v_{repr} \rfloor}. \quad (2)$$

Method 200 further includes generating 206 interpolating microscopic frames employing a trained artificial neural network. Generating 206 interpolating microscopic frames involves generating a predetermined number of interpolating image frames, wherein each interpolating image frame interpolates between subsequent image frames of the image frame sequence. Generating 206 interpolating microscopic frames may yield an expanded image frame sequence with a frame rate corresponding to the interpolation factor determined in step 204.

As a result of a requirement of $v_{repr}/\alpha_{interp} \leq 1$, the remaining optical flow between successive image frames in the expanded image frame sequence is lower than one pixel per frame and rolling average may be employed to improve signal-to-noise in the expanded image frame sequence without creating the spurious effects discussed above.

In particular, the approach according to steps 202 to 206 of method 200 involves determining an optical flow to determine an interpolation factor. However, in embodiments described, determining interpolating image frames corresponding to the interpolation factor might not rely on determining an optical flow. In embodiments, generating 206 interpolating microscopic frames may employ an artificial neural network that does not rely on estimating an optical flow, as described below with reference to FIG. 4. Not relying on estimating an optical flow for generating the interpolating image frames may allow for reducing latency of the step of generating the interpolating image frames.

In embodiments, generating 206 interpolating microscopic frames involves recursive generation of interpolating image frames. In these embodiments, the interpolation factor is determined as a power of 2. The input image frame sequence may be processed a first time to create one interpolating image frame between each successive image frames of the input image frame sequence to yield a first extended microscopic frame sequence with a double frame rate. The first extended image frame sequence may again be processed by the trained artificial neural network to again generate an interpolating image frame between each successive microscopic image frames of the first extended image frame sequence to yield a second extended image frame sequence with a frame rate four times the frame rate of the input image frame sequence. Hence, the frame rate of the extended image frame sequences may be doubled until the desired multiplicity of the interpolation factor of $\alpha_{interp}$ is reached.

Method 200 further comprises processing 208 the expanded image frame sequence by applying a time-dependent combination of the image frames in the expanded image frame sequence, such that the resulting enhanced image frame sequence had improved signal-to-noise. In embodiments, applying the time-dependent combination of the image frames may be based on a weighted rolling average. According to other embodiments, applying the time-dependent combination of the image frames may be based on applying a Kalman-filter.

In a further embodiment, processing 208 the expanded image frame sequence may include applying a weighted rolling according to Equation (1). To avoid smearing of objects under application of Equation (1), the velocity $v_{obj}$ of moving objects in the image frame sequence should be $v_{obj} \leq 1$ pixel per frame. Moreover, $\sigma$, $w \leq 1/v_{obj}$ should be satisfied.

Specifically, the parameters for weighted rolling average in Equation (1) may be determined from $v_{repr}$ determined in step 204 according to $$\sigma = \frac{v_{repr}}{2}, w = \lfloor v_{repr} \rfloor. \quad (3)$$

Expanding the image frame sequence with an appropriate number of interpolating image frames and then applying a weighted rolling average as explained above therefore corresponds to applying a motion-aware rolling average.

In embodiments, method 200 may further comprise down-sampling 210 the enhanced image frame sequence yielded from step, such as, down-sampling the frame rate of the image frame sequence to correspond to the frame rate of the original image frame sequence. Down-sampling the enhanced image frame sequence may hence involve selecting every $\alpha_{interp}$-th image frame of the enhanced image frame sequence. For example, when the original image frame sequence is composed of $[f_1, f_2, \ldots, f_n]$, and $\alpha_{interp}=2$ is determined in method step 204, performing step 206 yields expanded image frame sequence $[f_1, f_{1.5}, f_2, f_{2.5}, \ldots, f_n]$, and performing step 208 yields enhanced image frame sequence $[r_1, r_{1.5}, r_2, r_{2.5}, \ldots, r_n]$, from which $[r_1, r_2, \ldots r_n]$ may be selected as an output image frame sequence with improved signal-to-noise ratio.

In embodiments, method 200 may further comprise applying 212 a de-noising algorithm on the enhanced and optionally down-sampled image frame sequence to further boost signal-to-noise. De-noising algorithms of the state of the art only consider single image frames without considering motion of objects depicted. In embodiments, applying the de-noising algorithm may include applying a convolutional neural network. Because de-noising is applied subsequent to forming a time-dependent combination of the image frames, the problem of hallucinations as discussed above with reference to FIG. 1A is reduced. In particular, applying de-noising algorithms to the enhanced image frame sequence synergistically combine de-noising approaches and interpolation approaches.

Figure 4:
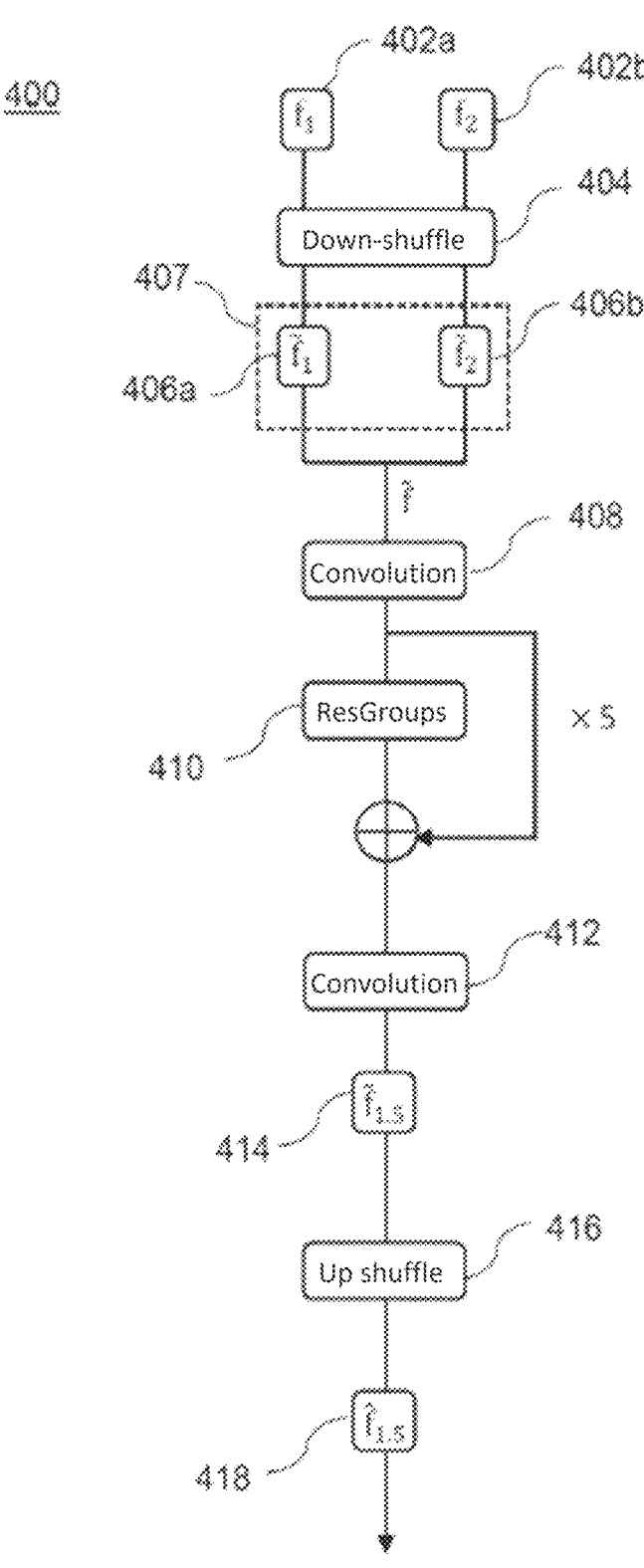
FIG. 4 illustrates an artificial neural network employed according to an embodiment.

FIG. 4 illustrates the architecture of the chained artificial neural network 400 configured for performing step 206 of generating interpolating microscopic frames corresponding to $\alpha_{interp}$.

Artificial neural network 400 may be selected as a lean artificial neural network. In particular, artificial neural network 400 may lack sub-modules dedicated to estimating an optical flow. Thereby, the artificial neural network 400 may provide low latency in performing step 206 of generating the interpolating image frames. Embodiments of the present disclosure may hence involve real-time processing of image frame sequences for signal-to-noise improvement.

Because optical flow determination is very sensitive to noise and because microscopy images, in particular, are affected by higher noise than usual photography images, usual frame interpolation methods by optical flow estimation fail. In addition, artificial neural networks for frame interpolation based on optical flow rely on being trained with simulated videos, as described in Sun et al.: *"PWC-Net: CNNs for optical flow using pyramid, warping, and cost volume"* Proceedings of the IEEE Conference on Computer Vision and Pattern Recognition, 2018. However, in the context of the present application, large-scale annotated data, e.g. for biological time lapses, may be unavailable.

Furthermore, artificial neural network 400 may be selected to be able to cope with large movements that imply temporal jittering and motion blurriness. In contrast, well-known methods such as described in Baker et al.: *"A database and evaluation methodology for optical flow"*, International Journal of Computer Vision 92.1, 2011, pages 1-31 or the phase-space based algorithm of Meyer et al.: *"Phase-based frame interpolation for video"*, in Proceedings of the IEEE conference on Computer Vision and Pattern Recognition, 2015, require that the shift of objects between two frames is small.

In embodiments, artificial neural network 400 involves a feature reshaping operation with channel attention that replaces optical flow computation modules of other approaches. The feature reshaping operation may correspond to a pixel shuffle operation. Artificial neural network may be configured for distributing information in a feature map of the image frames into multiple channels and extract motion information by attending the channels for pixel-level synthesis of an interpolating frame.

Specifically, artificial neural network 400 may be configured to receive input image frames 402a and 402b that are separately processed by down-shuffle operation 404. Down shuffle 404 is an operation to reorganize an image frame by pooling the image frame with several switch variables to generate down-sampled image frames, while Up Shuffle 416 corresponds to performing the inverse procedure. Down shuffle 404 reduces the spatial dimensions of an image frame $F \in \mathbb{R}^{H \times W \times C}$ by a factor of s to obtain an image frame $F' \in \mathbb{R}^{H/s \times w/s \times s^2 C}$. After applying down shuffle 404, down-shuffled image frames 406a, 406b are concatenated in the channel direction in block 407. The channel dimension is reduced by performing a convolution operation 408 followed by ResGroups operation 410 which consist of 12 residual channel attention blocks. After another convolution 412, intermediate image frame 414 is yielded. Up shuffle 416 is applied to intermediate image frame 414 to yield interpolating microscopy image frame 418 that interpolates between image frames 402a and 402b. The artificial neural network may be configured as explained in Cho et al: *"Channel Attention Is All You Need for Video Frame Interpolation"*, AAAI, 2020, 10663-10671, which is herewith incorporated in its entirety.

Figure 5:
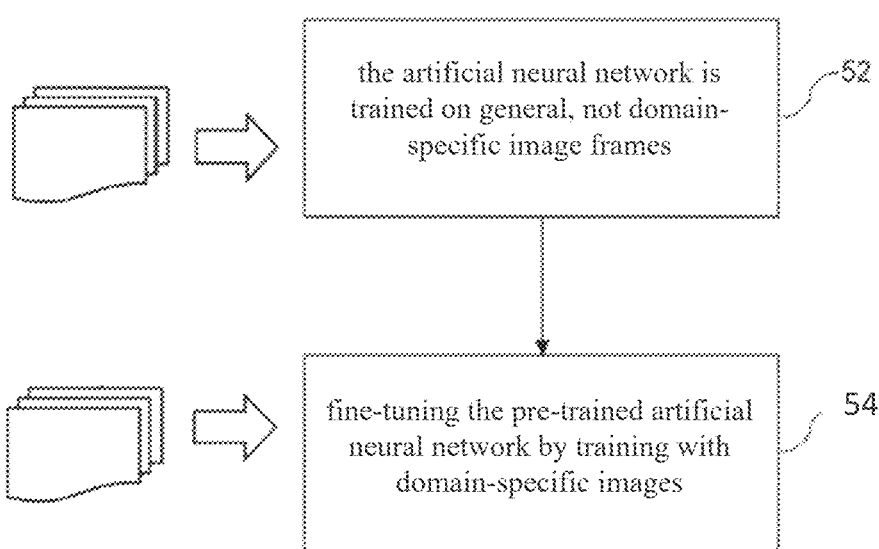
FIG. 5 illustrates a flowchart of a method of training an artificial neural network according to an embodiment.

FIG. 5 relates to a method of training an artificial neural network, for example, an artificial neural network configured as described above, for frame interpolation of image frames. In method step 52 the artificial neural network is trained on general, not domain-specific image frames. For example, benchmark data sets like Vimeo-90K (Xue et al.: *"Video enhancement with task-oriented flow International"*, Journal of Computer Vision, 127, pages 1106-1125, 2019) or SNU-FILM (Soomro et al.: *"UCF101: A dataset of 101 human actions classes from videos in the wild"*, arXiv: 1212.0402, 2012) may be employed. Step 52 involves that the first few layers of the artificial neural network are trained on simple image features like edges, corners of blobs, which are universal, and not specific to particular images domains. Moreover, the step of pre-training in method step 52 with non-microscopy videos with less noise than image frames makes it easier for a network to learn these low-level features.

Method 50 further includes step 54 of fine-tuning the pre-trained artificial neural network by training with domain-specific images, such as microscopy images or MRT images. Transfer learning as described allows to fine tune the artificial neural network for the specific application so that the pre-trained artificial neural network is trained on complex features of biological objects.

In embodiments, training data may comprise image frames of time lapses acquired across diverse types of microscopes, such as bright field microscopes, wide-field fluorescence microscopes, confocal microscopes, STED microscopes and lightsheet microscopes. To train an artificial neural network 400 as described above for the domain of microscopy time lapses, for example 12'000 image frames of time lapses were employed as training data.

Figure 6:
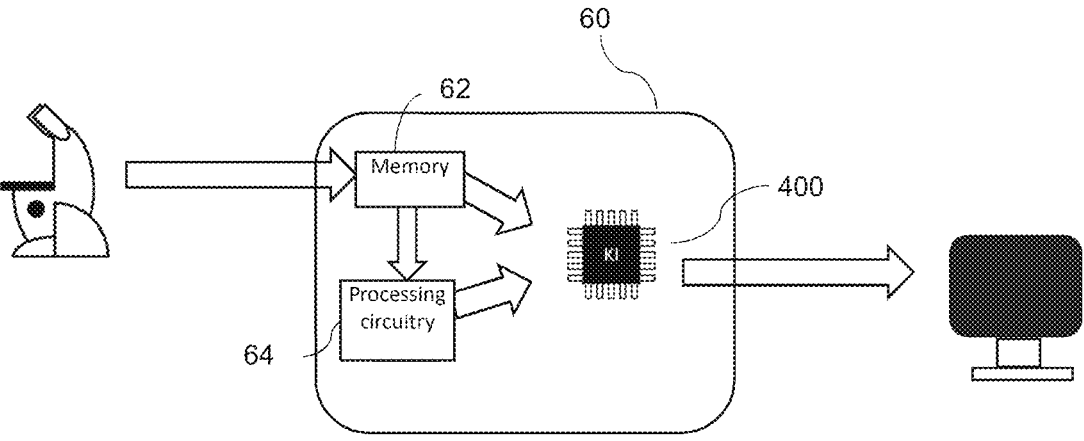
FIG. 6 illustrates an image processing device for improving signal-to-noise noise in an image frame sequence.

FIG. 6 relates to an image processing device for improving signal-to-noise in an image frame sequence. Image processing device 60 comprises memory 62 for saving an image frame sequence at least temporarily. The image frame sequence may be received in memory 62 via a data communication link from a microscope.

Image processing device 60 further comprises processing circuitry 64 configured for estimating a representative velocity of an optical flow in an image frame sequence, as has been explained in further detail above. Processing circuitry 64 may be configured for determining an interpolation factor from the representative velocity of the optical flow as explained above.

The components of image processing device 60 may further be configured to deliver the image frame sequence and the interpolation factor to trained artificial neural network 400 for generating interpolating image frames in accordance with the interpolation factor. Trained artificial neural network 400 may output an expanded image frame sequence. Processing circuitry 64 may further process the expanded image frame sequence by applying a time-dependent combination of image frames to improve signal-to-noise. Processing circuitry 64 may optionally be configured to apply a de-noising algorithm to the enhanced image frame sequence. The enhanced image frame sequence may be outputted to a monitor in real-time.

In a particular embodiment, processing device 60 is provided in a surgical microscope that is equipped with a fluorescence microscope for capturing emissions from a contrast agent in biological tissue. In this embodiment, processing device 60 may continuously operate to provide image frame sequences with improved signal-to-noise which may be outputted as overlays in a field-of-view of the surgical microscope.

Figure 7:
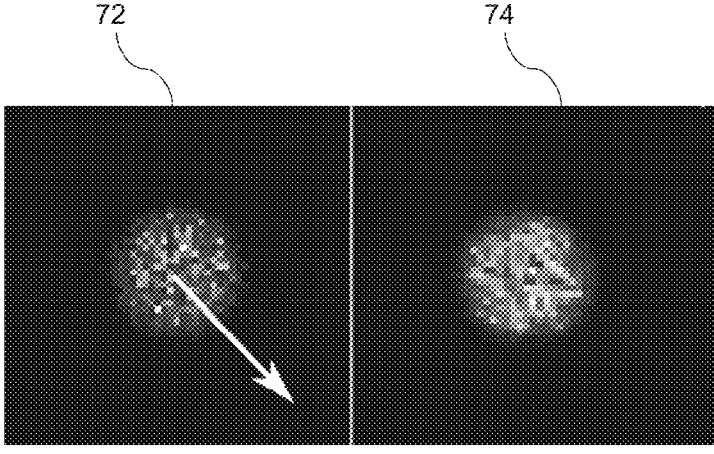
FIG. 7 reproduces exemplary image frames which illustrate improved signal-to-noise from employing methods of an embodiment.

FIG. 7 illustrates exemplary image frames that illustrate improvements of the present disclosure over the prior art in a simulated setting. FIG. 7 illustrates results for the simulated image frames of FIG. 1B. Panel 74 reproduce a result of applying motion aware rolling average according to method 200 to the image frame of panel 72. Parameters for weighted rolling average, applied as part of motion aware rolling averaging, are the same as for panel 18 of FIG. 1B, with σ=4 and w=8.

Figure 1B:
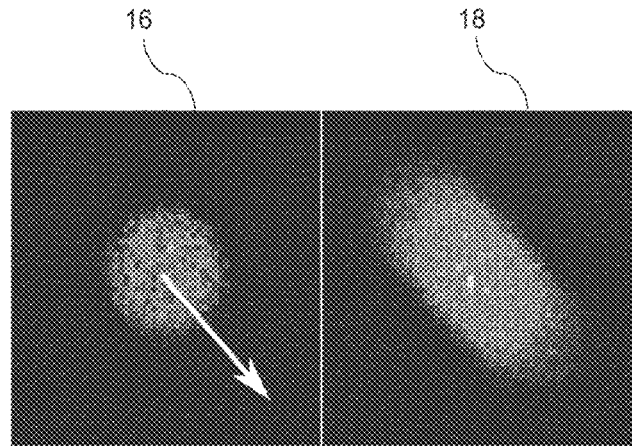
FIG. 1B illustrates applying a weighted rolling average to exemplary image frames according to methods of the prior art.
Figure 8:
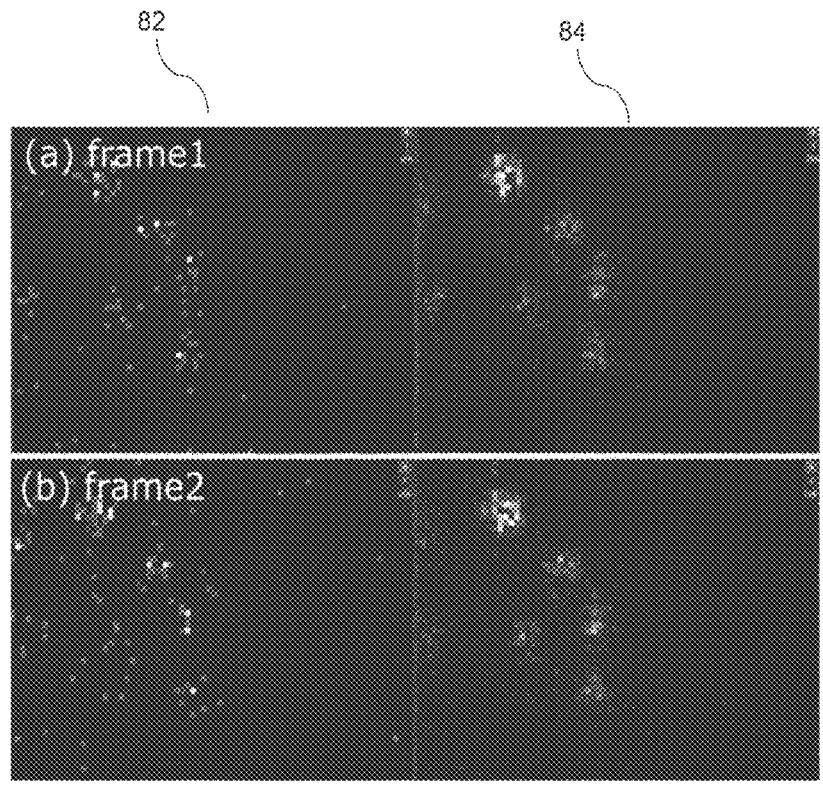
FIG. 8 illustrates further exemplary image frames which illustrate improved signal-to-noise employing methods of an embodiment.

FIG. 8 illustrates applying a motion-aware rolling average to successive fluorescence microscopy image frames of FIG. 1A. The image frames of column 82 are part of a larger image frame sequence, on which the disclosed motion-aware rolling average may be applied. Column 84 reproduces image frames resulting from applying the disclosed motion-aware rolling average. As is evident from the illustration of FIGS. 7 and 8, motion aware rolling average allows increasing signal-to-noise without distorting the content of the image frames.

Methods and systems described hence allow for significantly improving signal-to-noise in noisy image frame sequences, while avoiding creation of artefacts from inherent motion of captured objects. Embodiments described provide for a low-latency solution that allows applying the signal-to-noise improvement in real time.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, an HDD, an SSD, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improving signal-to-noise of image frames, the method comprising:

estimating a representative velocity of an optical flow in an image frame sequence;

determining an interpolation factor from the representative velocity of the optical flow, wherein a ratio of the representative velocity and the interpolation factor is equal to or less than one pixel per frame;

employing a trained artificial neural network for generating an expanded image frame sequence, wherein the expanded image frame sequence comprises a number of interpolating image frames, wherein each interpolating image frame interpolates between subsequent image frames of the image frame sequence, wherein the number of interpolating image frames corresponds to the interpolation factor;

generating an output image frame sequence by computing a time-dependent combination of image frames from the expanded image frame sequence.

2. The method of claim 1, wherein estimating the representative velocity of the optical flow comprises:

calculating a histogram of the optical flow between successive image frames in the image frame sequence; and analyzing the histogram to determine the representative velocity.

3. The method of claim 2, wherein analyzing the histogram to determine the representative velocity comprises employing the histogram to determine the representative velocity as a quantile for a predetermined threshold value.

4. The method of claim 2, wherein calculating the histogram is based on estimating a pixel-wise optical flow.

5. The method of claim 4, wherein estimating the pixel-wise optical flow is based on Farnebäck's algorithm.

6. The method of claim 1, wherein the image frames of the image frame sequence are microscopy image frames.

7. The method of claim 1, wherein the trained artificial neural network is configured for generating the interpolating image frames by applying a feature reshaping operation with channel attention.

8. The method of claim 7, wherein the feature reshaping operation comprises a pixel shuffle operation.

9. The method of claim 1, wherein the interpolation factor is a power of two and wherein the trained artificial neural network is configured for recursively generating and adding the interpolating image frames to the image frame sequence, wherein a number of recursions corresponds to the power.

10. A method for improving signal-to-noise of image frames, the method comprising estimating a representative velocity of an optical flow in an image frame sequence;

determining an interpolation factor based on the representative velocity of the optical flow;

employing a trained artificial neural network for generating an expanded image frame sequence, wherein the expanded image frame sequence comprises a number of interpolating image frames, wherein each interpolating image frame interpolates between subsequent image frames of the image frame sequence, wherein the number of interpolating image frames corresponds to the interpolation factor;

generating an output image frame sequence by computing a time-dependent combination of image frames by applying a rolling average to the expanded image frame sequence.

11. The method of claim 10, wherein the rolling average is a weighted rolling average and wherein applying the weighted rolling average comprises determining parameters for the weighted rolling average from the representative velocity.

12. The method of claim 11, wherein the parameters for the weighted rolling average are a window size determining a group of image frames from the expanded image frame sequence that contribute to the weighted rolling average, and a width determining a weight by which each image frame from the group of image frames contributes to the weighted rolling average.

13. The method of claim 1, further comprising applying a de-noising algorithm to the output image frame sequence.

14. The method of claim 1, wherein the trained artificial neural network has been trained by:

pre-training an artificial neural network with image frame sequences that are not domain specific; and training the artificial neural network with domain-specific image frames.

15. An image processing device for improving signal-to-noise of image frames by carrying out the method of claim 1, the image processing device comprising:

a memory configured for saving an image frame sequence at least temporarily;

processing circuitry configured for estimating a representative velocity of an optical flow in the image frame sequence and for determining an interpolation factor from the representative velocity of the optical flow; and a trained artificial neural network for generating an expanded image frame sequence, wherein the expanded image frame sequence comprises a predetermined number of interpolating image frames, wherein each interpolating image frame interpolates between subsequent image frames of the image frame sequence, wherein the predetermined number corresponds to the interpolation factor, wherein the processing circuitry is further configured for computing a time-dependent combination of image frames from the expanded image frame sequence to generate an output image frame sequence.

* * * * *